(12) United States Patent
Rasmussen

(10) Patent No.: US 6,244,278 B1
(45) Date of Patent: Jun. 12, 2001

(54) DEVICE FOR CLEANING TRANSPORT CARTS

(75) Inventor: Kim Rasmussen, Broby (DK)

(73) Assignee: Ken Maskinfabrik, Broby (DK)

( * ) Notice: Subject to any disclaimer, the term of this patent is extended or adjusted under 35 U.S.C. 154(b) by 0 days.

(21) Appl. No.: 09/301,859

(22) Filed: Apr. 29, 1999

(30) Foreign Application Priority Data

Apr. 30, 1998 (DK) .................................................. 00593/98

(51) Int. Cl.[7] ....................................................... B08B 9/08
(52) U.S. Cl. .............................. 134/62; 134/83; 134/123; 134/22.1; 414/403
(58) Field of Search .............................. 134/123, 66, 68, 134/133, 200, 22.1, 62, 82, 83; 68/210; 414/403, 303

(56) References Cited

U.S. PATENT DOCUMENTS

| 807,367 | * | 12/1905 | Eick . | |
| 2,981,266 | * | 4/1961 | Tamburri | 134/123 |
| 2,997,048 | * | 8/1961 | Gertken et al. | 134/123 |

(List continued on next page.)

FOREIGN PATENT DOCUMENTS

| 38 28 035 A1 | 2/1990 | (DE) . |
| 42 15 614 A1 | 11/1993 | (DE) . |
| 43 15 633 A1 | 11/1994 | (DE) . |
| 0 425 331 A1 | 5/1991 | (EP) . |
| 1174 102 | 3/1984 | (SU) . |
| WO 97/39839 | 10/1997 | (WO) . |

*Primary Examiner*—Frankie L. Stinson

(57) ABSTRACT

The invention relates to a device for cleaning dirty transport containers, especially catering carts, the device comprising:—a cleaning chamber with essentially vertical chamber walls, a closable insertion opening for the transport containers, a supporting surface for the transport containers, a plurality of nozzles for emitting a cleaner for cleaning the transport containers, and a dryer for drying the cleaned transport containers, —an insertion track disposed against the insertion opening and outside the cleaning chamber for temporary keeping and insertion of the dirty transport containers, and—automated insertion in the cleaning chamber of dirty transport containers placed on the insertion track. The invention is characterized in that—the automated insertion comprises—a first insertion arm and a second insertion arm, said arms—are disposed at a mutual distance, and—are arranged to be able to be led from a first, active position in which the insertion arms can engage with a transport container placed in the device, to a second, inactive position in which the insertion arms are disengaged from the transport containers placed in the device, and—a support frame that carries the first and the second insertion arm and is provided with organs arranged to be able to displace the insertion arms in the active position from a position outside the cleaning chamber to a position inside the cleaning chamber, and back again into the inactive position.

7 Claims, 5 Drawing Sheets

U.S. PATENT DOCUMENTS

| | | | |
|---|---|---|---|
| 3,022,791 | * | 2/1962 | Larson .................................. 134/123 |
| 3,096,775 | * | 7/1963 | Clarke et al. ......................... 134/123 |
| 3,179,117 | * | 4/1965 | Gibson et al. ........................ 134/123 |
| 3,289,238 | * | 12/1966 | Sorenson et al. .................... 134/123 |
| 3,444,867 | * | 5/1969 | Thornton ............................... 134/123 |
| 3,675,665 | | 7/1972 | Sadwith ................................. 134/46 |
| 3,698,029 | * | 10/1972 | Pulliam ................................. 134/123 |
| 3,736,948 | * | 6/1973 | Crosswhite ............................ 134/123 |
| 3,738,516 | * | 6/1973 | Wells . |
| 3,801,371 | * | 4/1974 | Martin . |
| 3,893,843 | * | 7/1975 | Fry et al. . |
| 3,952,756 | * | 4/1976 | Sheppard . |
| 3,990,571 | * | 11/1976 | Kitterman et al. . |
| 4,279,263 | * | 7/1981 | Pulliam ................................. 134/111 |
| 4,408,625 | | 10/1983 | Kuhl ...................................... 134/144 |
| 4,421,132 | * | 12/1983 | Kuhl ...................................... 134/123 |
| 4,673,327 | * | 6/1987 | Knapp . |
| 4,682,927 | | 7/1987 | Southworth et al. ................. 414/217 |
| 4,741,351 | | 5/1988 | Minkin .................................. 134/144 |
| 4,807,319 | * | 2/1989 | Poitevin ................................ 134/123 |
| 4,913,301 | * | 4/1990 | Pickler . |
| 5,135,608 | * | 8/1992 | Okutami . |
| 5,329,952 | * | 7/1994 | Kojima et al. . |
| 5,413,132 | * | 5/1995 | Cronan . |
| 5,450,867 | * | 9/1995 | Galuszka . |
| 5,551,460 | * | 9/1996 | Runion . |
| 5,964,229 | * | 10/1999 | Brendel . |
| 6,090,218 | * | 7/2000 | Brackmann et al. ................. 134/123 |

* cited by examiner

DEVICE FOR CLEANING TRANSPORT CARTS

BACKGROUND ART

The present invention relates to a device for cleaning dirty transport containers, especially catering carts, and comprising: a cleaning chamber with essentially vertical chamber walls, a closable insertion opening for the transport containers, a supporting surface for the transport containers, a plurality of nozzles for emitting a cleaner for cleaning the transport containers, means for drying the cleaned transport containers, an insertion track for temporary keeping and insertion of said dirty transport containers and which is disposed against said insertion opening and outside the cleaning chamber, and means for automated insertion in the cleaning chamber of dirty transport containers placed on said insertion track.

A device for cleaning dirty transport containers, especially catering carts, is generally known from WO 97/39839. During use of this type of device, the user has so far inserted the catering carts manually in the cleaning chamber via the insertion opening, the cleaned catering carts being taken out manually through an exit opening opposite the insertion opening at the end of the cleaning process.

German Patent Application No. 43 15 633 concerns a cleaning device for continuous cleaning of dirty objects which by means of a continuously running band conveyor are inserted in the device at one of its ends and taken out at the other end. However, this device is inexpedient as the band conveyor must be installed as a permanent construction in the bottom of the device and thus is also affected by the sometimes corrosive cleaners which can be used during the cleaning process.

SUMMARY OF THE INVENTION

The object of the present invention is to provide an improved device of the kind mentioned in the opening paragraph, whereby an effective, automated insertion and taking out of the objects to be cleaned can be provided with particularly simple means.

The above object is obtained by means of the device described in the opening paragraph, which is further characteristic in that the means for automated insertion comprise a first insertion arm and a second insertion arm, which arms are disposed at a mutual distance and arranged to be able to be led from a first active position in which the insertion arms can engage with a transport container placed in the device, to a second inactive position in which the insertion arms are disengaged from transport containers placed in the device, and a support frame that carries the first and the second insertion arm and is provided with organs arranged to be able to displace the insertion arms in the active position from a position outside the cleaning chamber to a position inside the cleaning chamber, and back again into the inactive position.

By, as stated in a sub-claim, particularly using these insertion means when the supporting surface is of the rotatable kind, specific advantages are obtained in that it is possible to provide both an automated insertion of the catering carts and a drying of these by rotating the supporting surface at high speed.

Said support frame, which carries the insertion arms, is preferably disposed outside the cleaning chamber whereby the organs for displacing the insertion arms are not affected in an inexpedient manner by the cleaners during the cleaning process. Said organs can, as stated in another sub-claim, comprise two slidable slides whereby the insertions arms can operate relatively far inside the cleaning chamber at a distance from the support frame.

As stated in a further sub-claim, the cleaning chamber can comprise an additional, closable opening giving access to the chamber and disposed immediately opposite said insertion opening and arranged to allow taking out of cleaned transport containers, an exit track for cleaned transport containers being arranged against said additional opening outside the cleaning chamber. This solution is especially expedient as the means for automatic insertion of transport containers will simultaneously with the insertion of a new set of dirty transport carts guide the containers cleaned immediately before out of the cleaning chamber.

The invention also relates to a method for implementing the invention whereby the device is controlled in such a way that the insertion arms can insert dirty transport containers in the cleaning chamber and subsequently be disengaged from the just inserted transport containers in order to be displaced out of the cleaning chamber whereby the cleaning process can be initiated.

BRIEF DESCRIPTION OF THE DRAWINGS

The invention will be explained in more detail below with reference to an embodiment shown in the drawings, in which.

DETAILED DESCRIPTION OF THE PREFERRED EMBODIMENT

Figure 1:
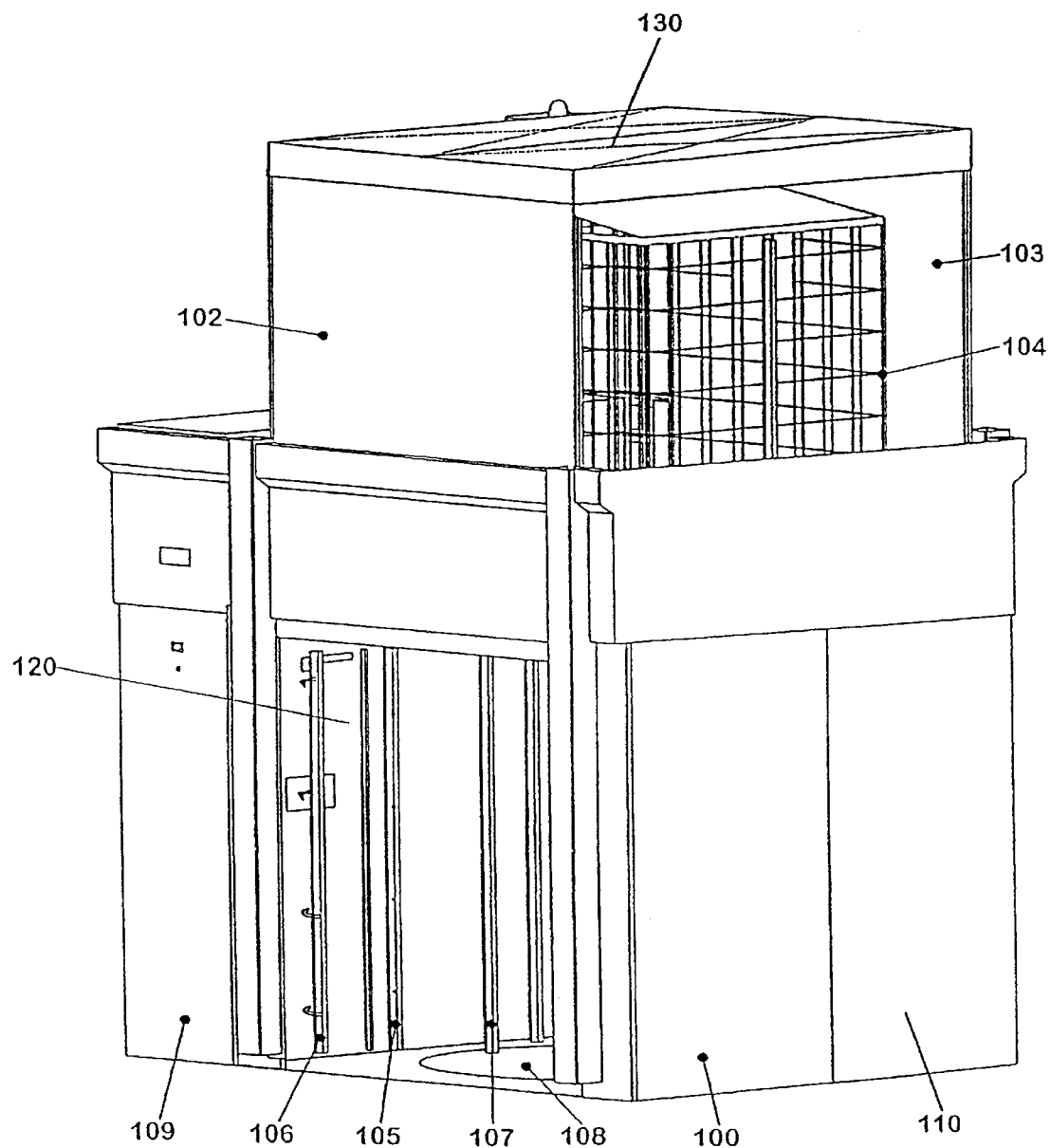
FIG. 1 is a perspective illustration of a known device for cleaning transport containers.

FIG. 1 is a perspective illustration of a known device with a cleaning chamber 100 for cleaning especially wheeled catering carts for use on board e.g. an aircraft or a train, for a more explicit description reference is made to WO 97/39839 which patent is hereby included as part of the present patent application.

The cleaning chamber 100 is defined by a bottom and four two by two parallel, vertical walls, namely a front wall 102, a back wall 103 and two side walls 110, 120. The front wall 102 and the back wall 103 are displaceable perpendicularly so that they can be led from the position in FIG. 1, in which they give access to the interior of the cleaning chamber 100, and down to a closed position, in which the cleaning chamber 100 is closed outwardly. The front wall 102 and the back wall 103 can be journaled in vertical guiding rails arranged along the extreme edge of the side walls 110, 120 and are furthermore interconnected via a horizontal top part 130 forming the enclosure of the cleaning chamber 100 upwardly.

As described in the above patent, a round turntable 108 is journaled in the bottom of the cleaning chamber 100, on which turntable the catering carts to be cleaned are placed, and which during the cleaning process is made to rotate. By disposing nozzles 105, 106 for emitting a cleaner on the side walls 110, 120, it is possible to spray a cleaner on the catering carts, and the rotation of the turntable ensures a complete distribution of this cleaner on the catering carts. By subsequently increasing the rotational speed of the turntable 108, a drying of the catering carts is obtained in a conventional manner in that the liquid cleaner is spun away from the surfaces of the carts. It will be appreciated that the catering carts during cleaning are placed with open end-doors whereby liquid can enter and exit the carts easily.

In order to produce the described rotation of the turntable 108, the top part 130 is provided with a not shown motor drive which is connected to a number of telescopic, vertical driving rods 107 that can be made to describe a circular motion. The driving rods 107 are connected to the turntable 108 at the periphery of this and can due to the telescopic ability drive the turntable 108 round when the top part 130 is in the position shown in FIG. 1, and when the top part 130 is in the lowered position in which the cleaning chamber 100 is closed. The perpendicularly displaceable wire cage designated by the reference numeral 104 in FIG. 1 is rotatably mounted on the top part 130 and is lowered immediately before the cleaning process in order to enclose and support the catering carts.

During use of among others the described, known device, the user has, before starting a cleaning process, so far manually inserted dirty catering carts in the cleaning chamber 100 via the insertion opening that is formed when the front wall 102 is in the position shown in FIG. 1. Before this, cleaned catering carts have been taken out through the opposite exit opening which likewise appears due to the coupling between the front wall 102 and the back wall 103. In this connection, it is to be noted that it is normally demanded that, at cleaning of especially catering carts, the carts for sanitary reasons are taken out of the chamber 100 at another place than at the insertion opening in order to avoid that cleaned carts by accident are mixed up with dirty carts. The front of the chamber 100 at the front wall 102 and the back at the back wall 103 are typically designated the "dirty side" and the "clean side" respectively.

Obviously, the described manual operation is time-consuming and implies in principle that a person on the "clean side" takes the cleaned carts out, and that the same person, or perhaps another person, subsequently inserts dirty carts in the chamber 100 from the "dirty side". At the same time, it is in principle necessary for the person in question to ensure a correct positioning of the carts, which not only entails inconvenient working postures but also results in the fact that any cleaning fluid in the chamber bottom is brought out of the chamber 100 onto the person's footwear.

The invention aims at rectifying the above inconveniences by providing especially simple means for automated insertion and removal of the catering carts, these means also having to consider the cleaning process in the cleaning chamber 100, especially where the device is of the kind that comprises a turntable 108.

According to the invention, the cleaning device comprises an insertion track 140 disposed immediately in front of the insertion opening and possibly provided with a track 12 with side guides against which the steering wheel of the catering carts can abut. This is further illustrated in FIG. 2 which shows the device from above, the cleaning chamber 100 being illustrated schematically without the top part 130 visible. Before insertion, the dirty catering carts 2 are placed on the insertion track 140 and await the conclusion of the cleaning of the set of catering carts 1 which are already in the cleaning chamber 100. It will be appreciated that the designation "insertion track" merely means an area immediately in front of the insertion opening of the cleaning chamber 100 where there is room for placing a number of dirty transport containers corresponding to the capacity of the cleaning chamber 100.

Figure 2:
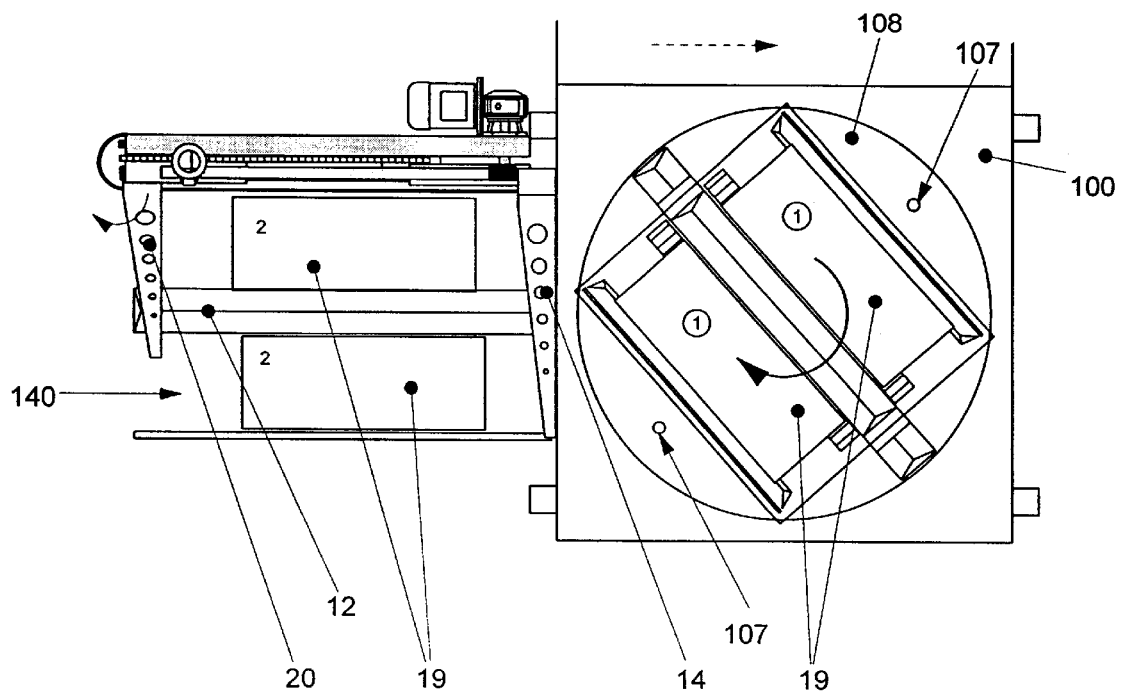
FIG. 2 is a plan view of the device according to the invention with the arms in the active position.
Figure 3A:
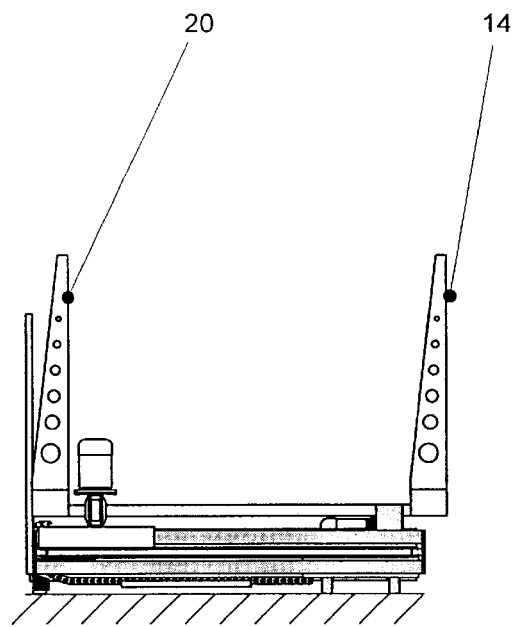
FIG. 3a and 3b are side elevational views of the means for automated insertion in the cleaning chamber of dirty transport containers with the arms in the inactive position.
Figure 3B:
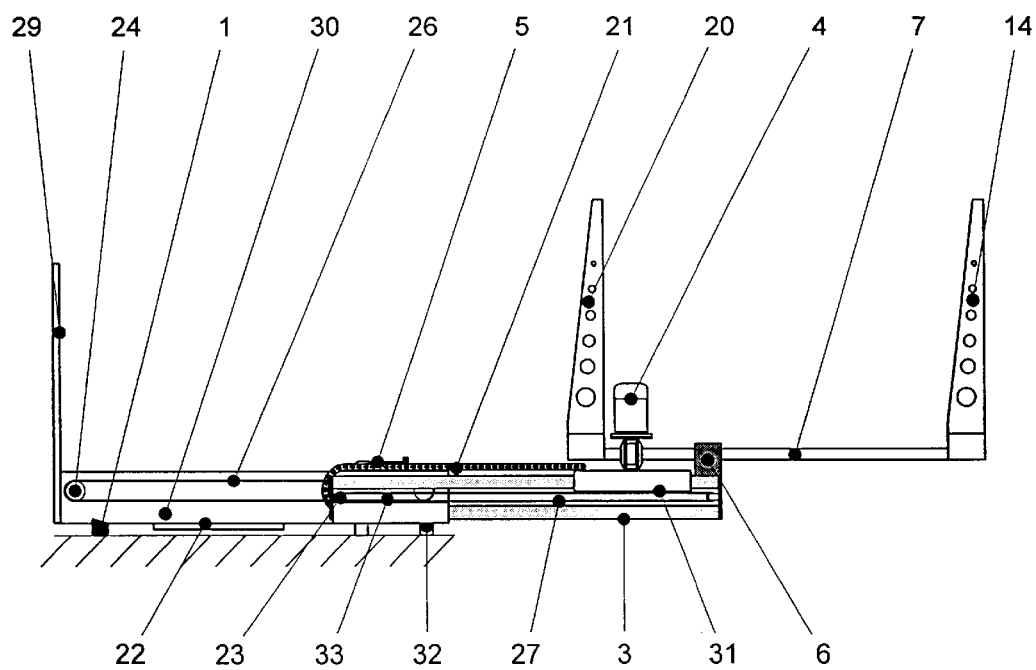
Figures 4A, 4B:
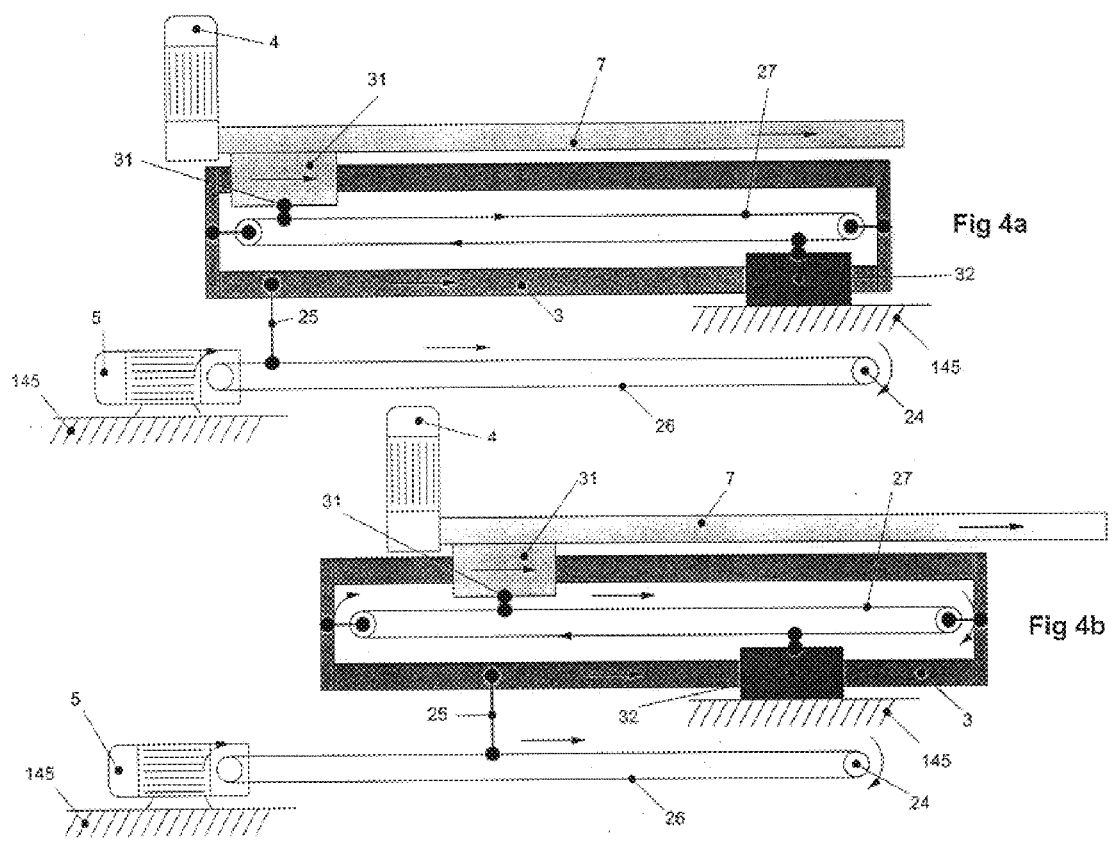
FIG. 4a and 4b are side elevational views of a notched belt system for driving the insertion means.

Next to the insertion track 140 and along this is arranged a support frame 145, which is shown in more detail in FIG. 3a and 3b, and on which a first slide 3 is journaled that is slidable in relation to the support frame 145 in a direction towards and away from the insertion opening in the cleaning chamber 100, i.e. to the right and to the left in FIG. 2. It will be appreciated that the support frame is immovable in relation to the chamber 100. On the first slide 3 is journaled another slide 31 that is slidable in relation to the first slide 3 also in a direction towards and away from the insertion opening. The second slide 31 can, in relation to the support frame 145 and due to the described slidable ability, be led between the first extreme position shown in FIG. 3a and the second extreme position shown in FIG. 3b. The two slides 3, 31 are preferably driven by a respective notched belt system 25, 26, 27 as illustrated in FIG. 4a and 4b which show the two positions of the slides 3, 31, that correspond approximately to the extreme positions of the second slide 31 shown in FIG. 3a and 3b.

The two slides 3, 31 form a part of the automatic insertion means for the catering carts, the second slide 31 also comprising an elongated, tubular arm holder 7 on which two arms 14, 20 are journaled extending perpendicularly from the arm holder 7 at a mutual distance. One of the arms 14 is firmly connected to the arm holder 7 while the other arm 20 can be rotatably connected to the arm holder 7 in a guide recess in a way described below, for example via a not shown spring arrangement which gives the second arm 20 an initial spring stress in a direction towards a given starting position in relation to the arm holder. The tubular arm holder 7 is rotatably journaled in said second slide 31 and is thus able to rotate about its longitudinal axis by means of a motor device 4 placed on the second slide 31 whereby the arms 14, 20 can be swung between a vertical position (FIG. 3) and a horizontal position (FIG. 2).

Figure 5:
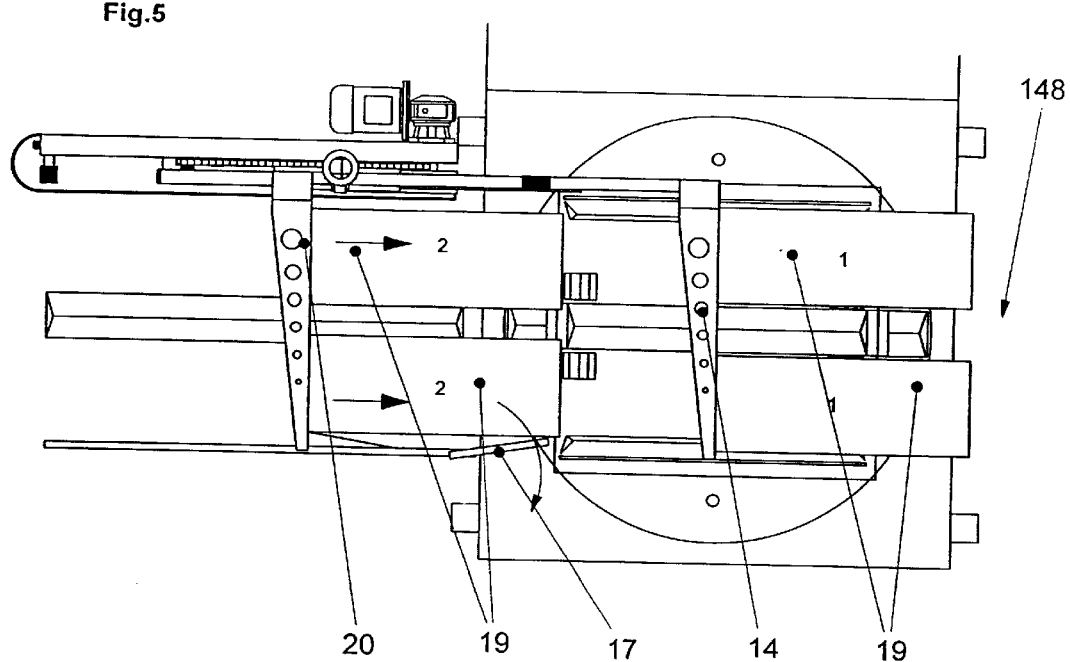
FIG. 5 is a plan view of the device in FIG. 2 in a second working state.

Reference is again made to FIG. 2 which together with FIG. 5 shows two states of the device, immediately before insertion of two dirty catering carts 2 in the cleaning chamber 100, and during insertion of these in the cleaning chamber 100, respectively. In FIG. 2, the device is shown in a working state where two catering carts 1 are being cleaned in the cleaning chamber 100 with the front and the back wall 102, 103 closed. The catering carts 1 are rotating on the turntable 108 at a given speed. In front of the front wall 102 are placed, on a respective side of the guide track 12, two conventional catering carts 2 to be cleaned. The two dirty catering carts 2 are placed between the two arms 14, 20. The arm 20 farthest from the wall 102 is, by means of a guide recess formed in the surface of the arm holder 7, guided to automatically follow the arm 14 when the latter, by means of the motor 4 which rotates the arm holder 7, is swung to its vertical position. When the arm 14 is swung to its horizontal position, also by means of the motor 4, the arm 20 remains mainly vertical until it by the operator—after he has placed dirty carts on the insertion track 140—is swung to the horizontal position in FIG. 2 after which the insertion of the carts in the chamber 100 can be done as described below.

When the program which controls the cleaning process in the cleaning chamber 100 finishes the cleaning, the front wall 102 and the back wall 103 are automatically opened after which the dirty carts 2 are automatically led into the chamber 100 at the same time as the clean carts 1 are automatically led out of the chamber 100 on the other side of this. The latter operation is carried out by the two slides 3, 31 being led simultaneously in fine direction of the arrow in FIG. 5 whereby one of the arms 14 on the second slide 31 is made to abut against one of the end surfaces of the clean carts 1 while the other arm 20 is made to abut against one of the end surfaces of the dirty carts 2. When the dirty carts 2 in this way are led completely into the chamber 100 and in place on the turntable 108, the clean carts 1 will, by an appropriate choice of the distance between the arms 14, 20, be outside the cleaning chamber 100 on an exit track 148 made for this purpose so that the wall 103 can be closed. At this time, the arm holder 7 is swung about its longitudinal axis by means of the adjunct motor 4 whereby both arms 14, 20 are led from the horizontal position shown in FIG. 2 and 5 to a vertical position shown in FIG. 3b. In this vertical position, the arm 14 can be led back towards the arrow in FIG. 5 along the side of the just inserted dirty catering carts 2 and past these, and thereby to the first extreme position of the second slide 31. The device can be programmed to subsequently close the chamber 100 by lowering of the front wall 102 and the back wall 103, whereupon the cleaning of the dirty carts 2 can be initiated. The arm holder 7 is then swung by means of the motor 4 so that the arm 14 will be in its horizontal position shown in FIG. 2. From the moment when the arms 14, 20 are inside the cleaning chamber 100, a new set of dirty carts can be placed on the insertion track 140, between the positions in which the arms 14, 20 subsequently are swung down to horizontal position.

It will be appreciated that the insertion and emptying process thereby can take place without the staff having to enter the cleaning chamber 100 at the same time as labor for taking out the clean carts at the "clean side" of the device is avoided. It will furthermore be appreciated that the distance between the arms 14, 20 can be chosen so that it at least allows for insertion of conventional catering carts on the turntable at the same time as the cleaned catering carts can be taken completely out of the chamber. By means of a signaler, an operator can if needed be signaled each time that the device is ready to receive dirty carts on the insertion track 140.

The drawings show a single support frame 145 with slides 3, 31 placed on one of the longitudinal sides of the insertion track 142. Naturally, there could, if needed, be placed a similar support frame with slides on the opposite side of the insertion track, which might be expedient in case of large devices where insertion arms perhaps are wanted that extend inwards from each longitudinal side of the insertion track for conveying the carts. In the shown solution, the guide arm 17 shown in FIG. 5 can, if desired, be built-in and it serves for preventing the carts 1, 2 from unintentionally moving sideways in the transition between the insertion track 140 and the turntable 108. The guide arm 17 will usually be prestressed so that it in normal position will be outside the cleaning chamber 100 transversely to the insertion track 140 to allow closing of the front wall 102 while it, at insertion of the carts 1, 2, is deflected to the position shown in FIG. 5.

Figure 6:
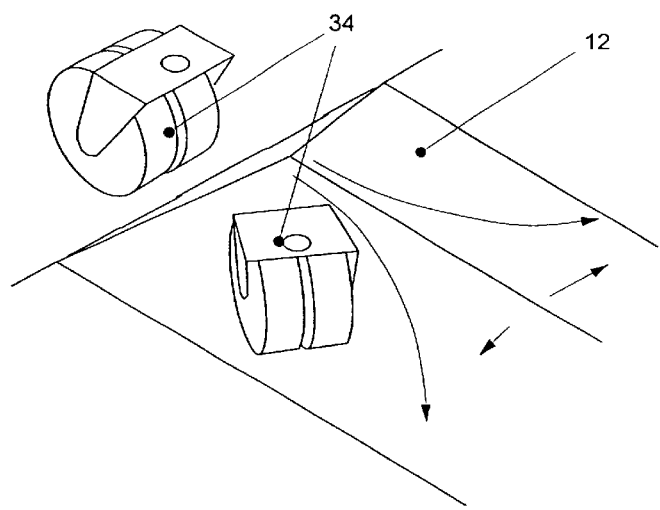
FIG. 6 is a sectional view of the insertion track with a guide track.

FIG. 6 shows in detail the design of the guide track 12 of the insertion track 140, the guide track being placed lengthwise of the insertion track 140 between two carts. The guide track 12 consists of side guides in the form of an elevation with two inclined sides 13, 22 that steadily guide the steering wheel 34 of the catering carts in place on the respective side of the insertion track 140, which considers the position of the steering wheels 34 when the carts 1, 2 are placed on the insertion track 140. In addition to that, the second slide 31 and a fixed elevation placed opposite this on the opposite side of the insertion track 140 can also have guide edges serving the same guiding function as the side guides 13, 22.

It is to be noted that the device in the above description is described in a situation where the carts 1, 2 are inserted in the chamber 100 at one of the sides and taken out at the opposite side. However, nothing precludes the use of a device where the chamber 100 is only provided with one access opening which thus is used for both inserting and taking out the catering carts. Also in this situation, it is, by means of the invention, avoided that the staff has to enter the chamber during insertion/taking out of the carts. In this case, the arms 14, 20 will, at taking out of clean carts 1 after the cleaning process, at first be led into the chamber 100 in the vertical position shown in FIG. 3b, the arms 14, 20 being swung, when the slide 31 has reached its mentioned second extreme position, to the horizontal position so that one of the arms 14 is made to abut against the front of the catering carts 1. After this, the carts 1 can be pulled out of the chamber 100 and out onto the insertion track 140 by leading the slide 31 towards its first extreme position as shown in FIG. 3a.

What is claimed is:

1. A device for cleaning dirty transport containers, said device comprising:

a cleaning chamber with essentially vertical chamber walls, a closable insertion opening for the transport containers, a supporting surface for the transport containers, a plurality of nozzles for emitting a cleaner for cleaning the transport containers, and means for drying the cleaned transport containers, an insertion track disposed against said insertion opening and outside the cleaning chamber for temporary keeping and insertion of said dirty transport containers, and means for automated insertion in the cleaning chamber of dirty transport containers placed on said insertion track, wherein the means for automated insertion comprise a first insertion arm and a second insertion arm, said arms are disposed at a mutual distance, and are arranged to be able to be led from a first, active position in which the insertion arms can engage with a transport container placed in the device, to a second, inactive position in which the insertion arms are disengaged from transport containers placed in the device, and a support frame that carries the first and the second insertion arm and is provided with organs arranged to be able to displace the insertion arms in the active position from a position outside the cleaning chamber to a position inside the cleaning chamber, and back again into the inactive position.

2. A device according to claim 1, wherein said supporting surface is rotatable, and wherein the supporting surface forms said means for drying the transport containers.

3. A device according to claim 1, wherein the support frame which carries the insertion arms is disposed outside the cleaning chamber.

4. A device according to claim 1, wherein the cleaning chamber comprises an additional, closable opening giving access to the chamber and disposed immediately opposite said insertion opening and arranged to allow taking out of cleaned transport containers, and wherein an exit track for cleaned transport containers is arranged against said additional opening outside the cleaning chamber.

5. A device according to claim 1, wherein the organs for displacing the insertion arms consist of a first slidable slide and a second slidable slide.

6. A device according to claim 1, wherein the insertion arms are journaled on a joint arm holder, and the arm holder is rotatably journaled on organs for allowing leading of the arms from the active position to the inactive position, and back again.

7. A method for cleaning dirty transport containers, using a device according to claim 4, wherein dirty transport carts are placed on the insertion track, the insertion opening in the chamber is opened, the insertion arms are led to the active position, the organs are activated to displace the insertion arms to said position inside the cleaning chamber whereby one of the arms engages with the dirty transport containers and leads these inside the cleaning chamber while the other arm simultaneously engages with any cleaned transport containers inside the cleaning chamber and leads the cleaned transport containers out of the cleaning chamber, the insertion arms are led to the inactive position, and the organs are activated to displace the insertion arms back to said position outside the cleaning chamber.

* * * * *